(12) United States Patent
Glenister et al.

(10) Patent No.: US 10,358,547 B2
(45) Date of Patent: Jul. 23, 2019

(54) LOW DENSITY POLYOLEFIN RESINS WITH HIGH DIMENSIONAL STABILITY

(71) Applicant: EQUISTAR CHEMICALS, LP, Houston, TX (US)

(72) Inventors: Peter J. Glenister, Milford, MI (US); Michael J. Dammann, New Lothrop, MI (US); Changlai Yang, Okemos, MI (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 15/866,136

(22) Filed: Jan. 9, 2018

(65) Prior Publication Data

US 2018/0134884 A1    May 17, 2018

Related U.S. Application Data

(63) Continuation of application No. 15/648,716, filed on Jul. 13, 2017, now Pat. No. 9,902,846.

(60) Provisional application No. 62/363,729, filed on Jul. 18, 2016.

(51) Int. Cl.
| | |
|---|---|
| *C08L 23/12* | (2006.01) |
| *C08K 3/00* | (2018.01) |
| *C08L 23/16* | (2006.01) |
| *C08L 53/02* | (2006.01) |

(52) U.S. Cl.
CPC .............. *C08L 23/12* (2013.01); *C08K 3/00* (2013.01); *C08L 23/16* (2013.01); *C08L 53/02* (2013.01); *C08L 2205/025* (2013.01)

(58) Field of Classification Search
CPC .......... C08L 23/12; C08L 23/16; C08L 53/02; C08L 2205/025; C08K 3/00
USPC ....................................................... 524/451
See application file for complete search history.

(56) References Cited

U.S. PATENT DOCUMENTS

| | | | |
|---|---|---|---|
| 6,569,934 B2* | 5/2003 | Noel, III | C08K 5/04 524/445 |
| 8,846,805 B2 | 9/2014 | Kniesel et al. | |
| 2004/0132884 A1* | 7/2004 | Dotson | C08K 5/098 524/394 |
| 2009/0088510 A1 | 4/2009 | Jones, III et al. | |
| 2015/0099840 A1* | 4/2015 | Glogovsky | C08L 23/12 524/400 |

FOREIGN PATENT DOCUMENTS

WO    WO-2016033188 A1    3/2016

OTHER PUBLICATIONS

Dow ENGAGE Product Selection Guide (www.dgpengxu.corn/up_files/WX/Engage_POE.pdf). Downloaded—Dec. 7, 2017 Online—Aug. 21, 2015 (Year: 2015).*

Mgbemena et al. "Computational Approach to Modelling Fracture Behaviour of Polypropylene/Talc Composites", J. Minerals and Materials Characterization and Engineering, 2012, 11, 841-847. (Year: 2012).*

International Search Report and Written Opinion dated Sep. 6, 2017 (Sep. 6, 2017) for Corresponding PCT/US2017/041954.

* cited by examiner

*Primary Examiner* — Ronald Grinsted

(57) ABSTRACT

The present disclosure generally relates to low density compositions useful for making automotive components, such as molded parts, as well as other articles of manufacture; such compositions comprise (a) a polyolefin comprising polypropylene, a propylene-ethylene block copolymer, or combinations thereof, wherein the polyolefin blend is present in an amount ranging from about 53 wt. % to about 65 wt. %, based on a total weight of the composition; (b) a first elastomer, a second elastomer, and an impact-modifying compatibilizer, wherein the combined weight percent of components (b) ranges from about 27 wt. % to about 32 wt. %, based on the total weight of the composition; (c) a filler present in an amount ranging from about 5 wt. % to about 12 wt. %, based on the total weight of the composition; and (d) an additive package present in an amount ranging from about 0.5 wt. % to about 5 wt. %.

20 Claims, No Drawings

LOW DENSITY POLYOLEFIN RESINS WITH HIGH DIMENSIONAL STABILITY

CROSS REFERENCE TO RELATED APPLICATIONS

This application claims the benefit of priority to U.S. Provisional Application No. 62/363,729, filed Jul. 18, 2016, the contents of which are incorporated herein by reference in their entirety.

BACKGROUND

Field of the Invention

In general, the present disclosure relates to the field of chemistry. More specifically, the present disclosure relates to polyolefin-based compositions. In some embodiments, the polyolefin-based compositions disclosed herein are useful as components for automobiles and other products, including injection molded parts.

Description of Related Art

The global automotive industry is seeking weight reduction for many components used to make vehicles in order to comply with increased fuel efficiency goals and other environmentally important standards (e.g., Corporate Average Fuel Economy (CAFE) in US, $CO_2$ limits in the European Union (E.U.)). Automotive components made from polyolefin-based compositions include spare-wheel compartment covers, underbody panels, seat backrests, engine and transmission covers, bumper fascia, rear panel shelves, and door trim panels. It would be desirable to achieve weight reductions in the polyolefin-based compositions (resins) used to make injection molded parts without compromising critical properties related to fit and function, including the compositions' coefficient of linear thermal expansion (CLTE), shrinkage, gap closure, etc. Challenges abound, as reducing, for example, higher weight filler content of a polyolefin-based composition may result in a disadvantageous increase in CLTE, shrinkage and/or panel gap.

SUMMARY OF THE INVENTION

In one aspect, the present disclosure provides for a composition comprising: (a) a polyolefin comprising polypropylene, a propylene-ethylene block copolymer, or combinations thereof, wherein the polyolefin is present in an amount ranging from about 53 wt. % to about 65 wt. %, based on a total weight of the composition; (b) a first elastomer, a second elastomer, and an impact-modifying compatibilizer, wherein the combined weight percent of the first elastomer, the second elastomer, and the impact-modifying compatibilizer ranges from about 25 wt. % to about 34 wt. %, based on the total weight of the composition; (c) a filler present in an amount ranging from about 5 wt. % to about 12 wt. %, based on the total weight of the composition; and (d) an additive package present in an amount ranging from about 0.5 wt. % to about 5 wt. %, based on the total weight of the composition; wherein the composition has a density ranging from about 0.90 to about 1.00 $g/cm^3$, an after-bake-mold-shrinkage (0.5 hours, 120° C.) ranging from about 0.5 percent to about 0.9 percent, a coefficient of linear thermal expansion ranging from about 1 to about 8 (10E-5 mm/mm/° C.), and a flexural modulus between about 1,200 MPa and about 2,500 MPa.

The present disclosure further describes articles that may be used as parts for automobiles, water vessels, locomotives, recreational vehicles, or airplanes, which comprise compositions comprising: (a) a polyolefin comprising polypropylene, a propylene-ethylene block copolymer, or combinations thereof, wherein the polyolefin is present in an amount ranging from about 53 wt. % to about 65 wt. %, based on a total weight of the composition; (b) a first elastomer, a second elastomer, and an impact-modifying compatibilizer, wherein the combined weight percent of the first elastomer, the second elastomer, and the impact-modifying compatibilizer ranges from about 25 wt. % to about 34 wt. %, based on the total weight of the composition; (c) a filler present in an amount ranging from about 5 wt. % to about 12 wt. %, based on the total weight of the composition; and (d) an additive package present in an amount ranging from about 0.5 wt. % to about 5 wt. %, based on the total weight of the composition; wherein the composition has a density ranging from about 0.90 to about 1.00 $g/cm^3$, an after-bake-mold-shrinkage (0.5 hours, 120° C.) ranging from about 0.5 percent to about 0.9 percent, a coefficient of linear thermal expansion ranging from about 1 to about 8 (10E-5 mm/mm/° C.), and a flexural modulus between about 1,200 MPa and about 2,500 MPa.

While multiple embodiments are disclosed, still other embodiments will become apparent to those skilled in the art from the following detailed description. As will be apparent, certain embodiments, as disclosed herein, are capable of modifications in various aspects, all without departing from the spirit and scope of the claims as presented herein. Accordingly, the drawings and detailed description are to be regarded as illustrative in nature and not restrictive.

DETAILED DESCRIPTION OF THE INVENTION

Provided herein are polyolefin-based compositions useful as components for automobiles, water vessels, locomotives, recreational vehicles, airplanes and other products, including, for example, injection molded parts. In some embodiments, these compositions (resins) allow for the preparation of injection molded parts having a reduced density while maintaining or improving one or more of the following properties of a higher density resin: CLTE, low shrinkage, and dimensional stability.

In one aspect of the present disclosure, there are provided compositions comprising:

(a) a polyolefin comprising a polypropylene, a propylene-ethylene block copolymer, or combinations thereof, wherein the polyolefin is present in an amount ranging from about 53 wt. % to about 65 wt. %, based on a total weight of the composition;

(b) a first elastomer, a second elastomer, and an impact-modifying compatibilizer, wherein the combined weight percent of the first elastomer, the second elastomer, and the impact-modifying compatibilizer ranges from about 25 wt. % to about 34 wt. %, based on the total weight of the composition;

(c) a filler present in an amount ranging from about 5 wt. % to about 12 wt. %, based on the total weight of the composition; and (d) an additive package present in an amount ranging from about 0.5 wt. % to about 5 wt. %, based on the total weight of the composition;

wherein the composition has a density ranging from about 0.90 to about 1.00 $g/cm^3$, an after-bake-mold-shrinkage (0.5 hours, 120° C.) ranging from about 0.5 percent to about 0.9 percent, a coefficient of linear thermal expansion ranging from about 1 to about 8 (10E-5 mm/mm/° C.), and a flexural modulus between about 1,200 MPa and about 2,500 MPa.

In some embodiments, the composition has a melt flow rate (MFR, ASTM D1238, 230° C., 2.16 kg) from about 15 g/10 min to about 50 g/10 min; alternatively from about 20 g/10 min to about 50 g/10 min; and alternatively from about 15 g/10 min to about 35 g/10 min.

In some embodiments, the composition has a density from about 0.90 g/cm$^3$ to about 0.97 g/cm$^3$. In some of these embodiments, the composition has a density from about 0.94 g/cm$^3$ to about 0.96 g/cm$^3$.

In some embodiments, the composition has a coefficient of linear thermal expansion (CLTE) from about 1 ($10^{-5}$ mm/mm/° C.) to about 8 ($10^{-5}$ mm/mm/° C.); alternatively from about 2 ($10^{-5}$ mm/mm/° C.) to about 8 ($10^{-5}$ mm/mm/° C.); alternatively from about 3 ($10^{-5}$ mm/mm/° C.) to about 8 ($10^{-5}$ mm/mm/° C.); alternatively from about 5 ($10^{-5}$ mm/mm/° C.) to about 8 ($10^{-5}$ mm/mm/° C.); alternatively from about 5.5 ($10^{-5}$ mm/mm/° C.) to about 6.5 ($10^{-5}$ mm/mm/° C.).

In some embodiments, the composition has a Charpy notched impact strength at 23° C. from about 25 kJ/m$^2$ to about 60 kJ/m$^2$. In some of these embodiments, the Charpy notched impact strength at 23° C. is from about 25 kJ/m$^2$ to about 50 kJ/m$^2$. In some of these embodiments, the Charpy notched impact strength at 23° C. is from about 28 kJ/m$^2$ to about 50 kJ/m$^2$. In some embodiments, the composition has a Charpy notched impact strength at 0° C. ranging from about 5 kJ/m$^2$ to about 35 kJ/m$^2$. In some of these embodiments, the composition has a Charpy notched impact strength at −40° C. from about 2 kJ/m$^2$ to about 5 kJ/m$^2$.

In some embodiments, the composition has a flexural modulus between about 1,500 MPa and about 2,200 MPa; alternatively between about 1,600 MPa and about 2,000 MPa; and alternatively between about 1650 MPa and about 2,100 MPa.

In some embodiments, the as-molded shrinkage ("AMMS") of the composition is ≤0.6%. In some embodiments, the as-molded shrinkage of the composition is from about 0.4% to about 0.8%. In some embodiments, the after-bake shrinkage of the composition is ≤0.8%. In some embodiments, the as-molded shrinkage of the composition is from about 0.5% to about 1.2%. In accordance with some embodiments of the present disclosure, the as-molded shrinkage may be measured using a modified ISO-294-4 method, wherein the method was modified by molding a 4×6×⅛ inch plaque comprising the composition, allowing the plaque to cool to room temperature and re-condition for over 24 hours, and measuring the average shrinkage utilizing a fixed gauge.

In some embodiments, the after-bake-mold-shrinkage ("ABMS") (0.5 hours, 120° C.) of the composition ranges from about 0.5% to about 1.0%, alternatively from about 0.6% to about 1.0%; alternatively from about 0.6% to about 0.9%; and alternatively from about 0.6% to about 0.8%. The after-bake-mold-shrinkage may be measured using a modified ISO-294-4 method, wherein the method was modified by molding a 4×6×⅛ inch plaque of the sample composition to a set temperature of 120° C. for either an hour or a half hour (as indicated), and measuring the average shrinkage after it is returned to room temperature and re-conditioned (i.e., allowed to stabilize by leaving it at room temperature and a controlled humidity for over 24 hours) utilizing a fixed gauge.

I. Polyolefin

In some embodiments, the polyolefin is present in an amount ranging from about 55 wt. % to about 63 wt. %, based on the total weight of the composition. In some of these embodiments, the polyolefin is present in an amount of about 59 wt. %, based on the total weight of the composition.

In some embodiments, the polyolefin comprises a polypropylene having high crystallinity homopolymer portions. "High crystallinity" refers to polypropylene with a percentage of mesopentad greater than 97% mmmm, as determined by high field NMR. See for example, WIPO PCT Patent Application Publication No. WO 2009/045351, which is incorporated herein by reference. In some of these embodiments, the polyolefin has a melt flow rate (MFR, ASTM D1238, 230° C., 2.16 kg) from about 40 g/10 min to about 90 g/10 min; alternatively from about 50 to about 80 g/10 min; alternatively from about 55 to about 75 g/10 min; alternatively from about 60 to about 70 g/10 min; and alternatively about 65 g/10 min.

In alternative embodiments, the polyolefin is a blend of two or more polypropylene homopolymers, or propylene-ethylene copolymers, or propylene-ethylene block copolymers, or one or more polypropylene homopolymer and one or more propylene-ethylene copolymers or propylene-ethylene block copolymers. In the alternative embodiment, the total polyolefin is present in an amount ranging from about 55 wt. % to about 63 wt. %, based on a total weight of the composition. In some of these embodiments, the total polyolefin is present in an amount of about 59 wt. %, based on a total weight of the composition. In some of these embodiments, the blended polyolefin has a combined melt flow rate (MFR, ASTM D1238, 230° C., 2.16 kg) of from about 40 g/10 min to about 90 g/10 min; alternatively from about 50 to about 80 g/10 min; alternatively from about 55 to about 75 g/10 min; alternatively from about 60 to about 70 g/10 min; and alternatively about 65 g/10 min. Accordingly, polyolefins having melt flow rates higher than those disclosed herein or lower than those disclosed herein may be utilized in order to obtain a blended polyolefin having an overall melt flow rate (MFR, ASTM D1238, 230° C., 2.16 kg) from about 40 g/10 min to about 90 g/10 min; alternatively from about 50 to about 80 g/10 min; alternatively from about 55 to about 75 g/10 min; alternatively from about 60 to about 70 g/10 min; and alternatively about 65 g/10 min.

Suitable polyolefins include commercially available polypropylenes, including without limitation ADSTIF™, METOCENE™, and PROFAX™, each available from LyondellBasell Industries (Houston, Tex., USA).

II. Elastomers

In some embodiments, the elastomers of the compositions provided herein have the following properties and are present in the amounts indicated below:

(i) the first elastomer comprises an ethylene-based copolymer having a density from about 0.87 g/cm$^3$ to about 0.90 g/cm$^3$, wherein the first elastomer is present in an amount ranging from about 10 wt. % to about 22 wt. %, based on the total weight of the composition;

(ii) a second elastomer comprising an ethylene-based copolymer having a density from about 0.85 g/cm$^3$ to about 0.87 g/cm$^3$, wherein the second elastomer is present in an amount ranging from about 4 wt. % to about 15 wt. %, based on the total weight of the composition; and (iii) an impact-modifying compatibilizer, wherein the impact-modifying compatibilizer is present in an amount ranging from about 0.5 wt. % to about 8 wt. %, based on the total weight of the composition;

such that the combined weight percent of the first elastomer, the second elastomer, and the impact-modifying compatibilizer ranges from about 25 wt. % to about 34 wt. %, alternatively from about 27 wt. % to about 32 wt. %, based on the total weight of the composition.

In some embodiments, the ethylene-based copolymer of the first elastomer is present in an amount ranging from about 12 wt. % to about 20 wt. %, alternatively from about 16 wt. %, based on the total weight of the composition. In some embodiments, the ethylene-based copolymer of the first elastomer has a melt flow rate (190° C., 2.16 kg) from about 0.4 g/10 min to about 1.1 g/10 min; alternatively from about 0.6 g/10 min to about 0.9 g/10 min. In some embodiments, the ethylene-based copolymer of the first elastomer is an ethylene-butene copolymer, ethylene-hexene copolymer, or an ethylene-octene copolymer.

In some embodiments, the ethylene-based copolymer of the second elastomer is present in an amount ranging from about 6 wt. % to about 12 wt. %; alternatively about 9 wt. %, based on the total weight of the composition. In some embodiments, the ethylene-based copolymer of the second elastomer has a melt flow rate (190° C., 2.16 kg) from about 1.0 g/10 min to about 1.5 g/10 min, for example, a melt flow rate of about 1.2 g/10 min. In some embodiments, the ethylene-based copolymer of the second elastomer is an ethylene-butene copolymer.

In alternative embodiments, the ethylene-based copolymer of the second elastomer has a melt flow rate (190° C., 2.16 kg) ranging from about 5 g/10 min to about 50 g/10 min; alternatively from about 10 g/10 min to about 40 g/10 min; alternatively from about 10 g/10 min to about 15 g/10 min; alternatively about 13 g/10 min; alternatively from about 25 g/10 min to about 35 g/10 min; alternatively about 30 g/10 min. In some embodiments, the ethylene-based copolymer of the second elastomer is an ethylene-octene copolymer.

In some embodiments, an impact-modifying compatibilizer for use with the present disclosure may be a styrene-ethylene-butylene-styrene (SEBS) rubber or a heterophasic polypropylene copolymer. In an embodiment, the impact-modifying compatibilizer may be present in an amount ranging from about 1 wt. % to about 10 wt. %; alternatively from about 2 wt. % to 8 wt. %; alternatively from about 4 wt. % to about 6 wt. %; and alternatively about 4 wt. %, based on the total weight of the composition. In some embodiments, the styrene-ethylene-butylene-styrene (SEBS) rubber of the impact-modifying compatibilizer has a melt flow rate (230° C., 5.0 kg) ranging from about 15 g/10 min to about 33 g/10 min, for example, a melt flow rate of about 22 g/10 min. In some embodiments, polyolefin heterophasic copolymer of the impact-modifying compatibilizer has a melt flow rate (230° C., 2.16 kg) ranging from about from about 0.1 g/10 min to about 2 g/10 min, alternatively from 0.35 g/10 min to 1 g/10 min, alternatively about 0.45 g/10 min.

In an embodiment, the heterophasic polypropylene copolymer of the impact-modifying compatibilizer comprises:

a) from 30-80 wt. % (alternatively from 30-70 wt. %; alternatively from about 45 wt. % to about 55 wt. %) of a semi-crystalline polypropylene component (Component A) having a monomodal molecular weight distribution selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof; optionally the semi-crystalline polypropylene may have a melt flow rate (MFR) of from 1 g/10 min to 500 g/10 min; and b) from 20-70 wt. % (alternatively from 40-70 wt. %; alternatively from about 45 wt. % to about 55 wt. %) of a bipolymer component (Component B) of propylene and at least one comonomer selected from ethylene and/or $C_4$-$C_{10}$ α-olefins, the bipolymer containing from 50-75% of propylene, wherein the bipolymer is soluble in xylene at room temperature and has an intrinsic viscosity [η] of from 4 to 7.5 dl/g (in decalin); optionally Component B is soluble in xylene at room temperature and has from 25 wt % to about 50 wt %, alternatively from about 30 wt % to about 45 wt %, ethylene moieties and an intrinsic viscosity [η] at room temperature of 4-7 dL/g (in decalin); and optionally Component B has a melt flow rate less than 0.15 g/10 min.

In some embodiments, the combined weight percent of the first elastomer, the second elastomer, and the impact-modifying compatibilizer ranges from about 25 wt. % to about 34 wt. %, alternatively from about 27 wt. % to about 23 wt. %, based on the total weight of the composition. Suitable elastomers and impact-modifying compatibilizer are commercially available from ExxonMobil Corporation under its Vistamaxx® brand, The DOW Chemical Company under its Engage® brand, LyondellBasell Industries under its Catalloy® brand, Kraton Performance Polymer Inc., and Mitsui Chemicals, Inc. under its Tafmer® brand.

III. Fillers

In some embodiments, the filler is present in an amount ranging from about 5 wt. % to about 12 wt. %, alternatively from about 6 wt. % to about 11.4 wt. %, alternatively from about 8 wt. % to about 11.5 wt. %, and alternatively about 9 wt. %, where each range and percentage being based on the total weight of the composition. In some embodiments, the filler may be a talc having a high aspect ratio, glass, glass bubbles, carbon fibers, mineral fibers, biofillers such as wood, flax, wheat staw, coconut, kenaf, and hemp, and combinations thereof (such as talc with glass bubbles or talc with carbon fibers).

IV. Additive Packages

In some embodiments, the additive package may comprise one or more of the following: antioxidant(s); mold release(s); scratch reduction additive(s); nucleating agent(s); neutralizer(s)/acid scavenger(s) selected from the group consisting of magnesium aluminum hydroxyl carbonate and hydrates thereof; and stearic acid and/or a stearate salt.

In some embodiments, the additive package comprises an antioxidant, wherein the antioxidant is an organophosphite or a blend of more than one organophosphite.

In some embodiments, the scratch reduction additive may include lubricants such as fatty amides; examples of which include oleamide ("OR"), ethylene bis-steramide (EBS), and/or erucamide, and the like. For example, the oleamide (OR) may be Crodamide® OR supplied by Croda; the erucamide (ER) may be Crodamide® ER supplied by Croda; and the ethylene bis-steramide (EBS) may be Crodamide® EBS supplied by Croda.

In some embodiments, the mold release additive may include one or more of glycerol monostearate, stearic acid, a stearate salt, magnesium stearate, calcium stearate, and the like. See, for example, U.S. Pat. No. 3,886,105, which is incorporated herein by reference. Alternatively, magnesium stearate may be used as a dispersion aid.

In some embodiments, the additive package comprises a nucleating agent, wherein the nucleating agent is hexahydrophthalic acid, a salt thereof, or an anhydride thereof. In some embodiments, the nucleating agent is a calcium salt of hexahydrophthalic acid. See, for example, WIPO PCT Application Publication No. WO 2008/073401, which is incorporated herein by reference. In some embodiments, the nucleating agent is present in an amount ranging from about 0.05 wt. % to about 3 wt. %; alternatively about 0.1 wt. % to about 0.2 wt. %, based on the total weight of the composition. In some of these embodiments, the nucleating agent is present in an amount of about 0.15 wt. %, based on the total weight of the composition.

In some embodiments, the additive package comprises a neutralizer/acid scavenger, wherein the neutralizer/acid scavenger is magnesium aluminum hydroxy carbonate or hydrates thereof. Magnesium aluminum hydroxy carbonate hydrates are effective in retarding hindered amine light stabilizer deactivation. One magnesium aluminum hydroxy carbonate hydrate for use with the present disclosure is sold under the trademark "DHT-4A or DHT-4V" by Kyowa Chemical Industry Co. Ltd.

In some embodiments, the additive package further comprises one or more of the following type of substances: colorants, odorants, deodorants, plasticizers, impact modifiers, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agents, blowing agents, emulsifiers, crosslinking agents, waxes, particulates, flow promoters, and other materials added to enhance processability or end-use properties of the polymeric components. Such additives may be used in conventional amounts. In some embodiments, the amounts do not exceed 10 weight percent (wt. %) of the total weight of the composition.

In some embodiments, the additives are added individually (or in combination) to the composition directly, optionally while the composition is being blended or extruded, such that the additives are distributed approximately evenly throughout the composition. This type of additive addition may be called a "salt and pepper addition." In other embodiments, the additives may be pre-blended into a polymer carrier. The polymer carrier may be a homopolymer of polyethylene or polypropylene. The polymer carrier having entrained additives may be referred to as a masterbatch. The masterbatch may be added while the composition is being blended or extruded such that the additives are distributed approximately evenly throughout the composition. Optionally, the polymer carrier may be 0.5-2 wt. % of the total weight of the composition; alternatively, the polymer carrier may be about 1 weight percent of the total weight of the composition. In still further embodiments, some of the additives may be added via a masterbatch route and other additives may be added via a salt and pepper addition.

In yet another embodiment, multiple masterbatches may carry different additives. For example, a first masterbatch may carry a colorant and a second masterbatch may carry the remainder of the additives. In embodiments using multiple masterbatches, the polymer carrier of each masterbatch may be the same or different.

V. Molded Parts/Articles

In another aspect, there are provided articles of manufacture comprising one or more of the compositions disclosed herein. In some embodiments, the article is a part of an automobile, such as a molded part but may also include water vessels, locomotives, recreational vehicles, airplanes and other products. In some embodiments, the molded part is a bumper fascia, a bumper, a rocker, a cladding, a wheel flare, a door panel, or an instrument panel. In some embodiments, such molded parts may be used to assist the automotive industry in their pursuit of manufacturing lower weight cars with improved fuel efficiency and lower emissions. In some embodiments, the molded parts disclosed herein exhibit a property profile of current higher density compositions, e.g., those used for current bumper fascia resins. Such properties include, for example, consistent shrinkage and CLTE properties, while exhibiting a reduced density. In contrast to other lower density compositions known in the art, the compositions provided herein do not, in some embodiments, result in an increase in CLTE or shrinkage. In some embodiments, the compositions (resins) provided herein are compatible with existing tooling and would therefore not require any or only limited retooling expense. In some embodiments, the compositions provided herein contrast with other low density compositions by avoiding any increase in expansion/contraction gapping. The auto industry is pursuing reduced gapping for improved craftsmanship.

In some embodiments, the articles may include embedded colorants. In alternative embodiments, the articles may be colored, painted, or sealed after (or before) being molded. In further embodiments, the articles may be coated with various materials to facilitate paintability. In still further embodiments, the articles may be coated with a clear seal or wax (before, after, or instead of being painted). The clear seal, wax, and/or paint (alone or in combination) may protect the article from elements such as sun, heat, wind, rain, road debris including dirt and bugs, tree pollen or sap, and/or bird droppings.

VI. Methods and Process

In another aspect, there are provided methods of making an injection molded part (e.g., of an automobile) comprising melt blending the constituents (a), (b), (c), and (d):

(a) a polyolefin comprising polypropylene, a propylene-ethylene block copolymer, or combinations thereof, wherein the polyolefin is present in an amount ranging from about 53 wt. % to about 65 wt. %, based on a total weight of the composition;

(b) a first elastomer, a second elastomer, and an impact-modifying compatibilizer, wherein the combined weight percent of the first elastomer, the second elastomer, and the impact-modifying compatibilizer ranges from about 27 wt. % to about 32 wt. %, based on the total weight of the composition;

(c) a filler present in an amount ranging from about 5 wt. % to about 12 wt. %, based on the total weight of the composition; and (d) an additive package present in an amount ranging from about 0.5 wt. % to about 5 wt. %, based on the total weight of the composition, wherein the composition has a density ranging from about 0.90 to about 1.00 g/cm$^3$, an after-bake-mold-shrinkage (0.5 hours, 120° C.) ranging from about 0.5 percent to about 0.9 percent, a coefficient of linear thermal expansion ranging from about 1 to about 8 ($10^{-5}$ mm/mm/° C.), and a flexural modulus between about 1,200 MPa and about 2,500 MPa. In some embodiments, the methods comprise pelletizing the melt blend to form a plurality of pellets. In some embodiments, the methods comprise injection molding the pelletized blend. In some embodiments, the constituents are blended with an extruder such as a high-intensity continuous mixer or an internal batch mixer (Banbury mixer, or a twin-screw extruder).

VII. Definitions

In the present description, the term "α-olefin" or "alpha-olefin" means an olefin of the general formula $CH_2=CH-R$, wherein R is a linear or branched alkyl containing from 1 to 10 carbon atoms. The α-olefin can be selected, for example, from propylene, 1-butene, 1-pentene, 1-hexene, 1-octene, 1-dodecene and the like.

In the present description, the term "elastomer" refers to polymer compounds having rubber-like properties and crystallinity in the range of from about 0 percent to about 20 percent. In some embodiments, the polymer can have crystallinity in the range of from about 0 percent to about 5 percent.

In the present description, the term "elastomeric ethylene copolymer composition" refers to a composition made from and/or containing at least one elastomeric ethylene copolymer.

In the present description, the term "heterophasic polypropylene copolymer" refers to a copolymer (or rubber copolymer) prepared by the copolymerization of ethylene and propylene dispersed into a polypropylene matrix. The polypropylene matrix may be a homopolymer or a copolymer.

In the present description, the term "homopolymer" and similar terms mean a polymer consisting solely or essentially of units derived from a single kind of monomer, e.g., ethylene homopolymer is a polymer comprised solely or essentially of units derived from ethylene, and propylene homopolymer is a polymer comprised solely or essentially of units derived from propylene, and the like.

In the present description, the term "impact-modifying compatibilizer" means a compound that synergistically interacts with the interface of the elastomeric ethylene copolymer composition and the polyolefin to improve the properties of the overall composition. For the purposes of the present disclosure the term "impact-modifying compatibilizer" includes the styrene-ethylene-butylene-styrene (SEBS) rubber and the heterophasic polypropylene copolymer described above.

In the present description, the term "interpolymer" refers to a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer comprises units derived from the monomers, e.g., $-CH_2-CH_2-$, and not the monomer itself, e.g., $CH_2=CH_2$.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from and/or containing at least one polymer.

In the present description, the term "polyolefin" as used herein includes polymers such as polyethylene, polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including for example, heterogeneous and homogeneous systems and Ziegler-Natta, Phillips, metallocene, single-site, and constrained geometry catalysts to produce polymers having different combinations of properties. Such polymers may be highly branched or substantially linear and the branching, dispersity and average molecular weight may vary depending upon the parameters and processes chosen for their manufacture in accordance with the teachings of the polymer arts.

In the present description, the term "room temperature" refers to a temperature around 23 degrees Celsius (unless it is defined differently in an ASTM, in which case "room temperature" means as it is defined within that ASTM for that particular test/procedure/method).

In the present description, the term "thermoplastic polymer" means a polymer that softens when exposed to heat and returns to its original condition when cooled to room temperature.

In the present description, the terms "Ziegler-Natta-catalyzed polymer" and "Z-N-catalyzed polymer" mean any polymer that is made in the presence of a Ziegler-Natta catalyst.

VIII. Testing Methods

Melt mass flow rates (MFR) are given in gram/10 min and were measured using ASTM D1238, which is entitled "Test Method for Melt Flow Rates of Thermoplastics by Extrusion Plastometer," under the conditions specified below. The term "ASTM D 1238" as used herein refers to a standard test method for determining melt flow rates of thermoplastics carried out by an extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Aug. 1, 2013 and published in August 2013, the contents of which are incorporated herein by reference in its entirety. For the referenced ASTM standards, visit the ASTM website, www.astm.org, or contact ASTM Customer Service at service@astm.org.

Filler or ash content is given in % and measured using ASTM D5630, which is entitled "Standard Test Method for Ash Content in Plastics." The term "ASTM D5630" as used herein refers to a standard test method for determining the inorganic content of plastics by destructive ashing procedures. This test method was approved on Apr. 1, 2013 and published in April 2013, the contents of which are incorporated herein by reference in its entirety. For the referenced ASTM standards, visit the ASTM website, www.astm.org, or contact ASTM Customer Service at service@astm.org.

Density is giving in g/cm$^3$ and measured using ISO 1183-1, which is entitled "Plastics-Methods for Determining the Density of Non-Cellular Plastics—Part 1: Immersion method, liquid pycnometer method and titration method." The term "ISO 1183-1" as used herein refers to the test method published as the second edition dated May 15, 2012, the content of which are incorporated herein by reference in its entirety.

Flexural modulus (or "flex modulus") is given in megapascals (MPa) and measured using ISO 178, which is entitled "Plastics—Determination of flexural properties." The term "ISO 178" as used herein refers to the test method published as the fifth edition dated Dec. 15, 2010, the content of which are incorporated herein by reference in its entirety.

Charpy notched impact strength (or "Notched Charpy Impact Strength") is given in KJ/m$^2$ and measured using ISO 179-1, which is entitled "Plastics—Determination of Charpy impact properties. Part 1: Non-instrumented impact test." The term "ISO 179" or "179-1" as used herein refers to the test method published as the second edition dated Jun. 15, 2010, the content of which are incorporated herein by reference in its entirety.

Multi-Axial Instrumented Impact (MAII) energy values are given in joules (J) and a percentage ductile failure mode is recorded, and measured using ASTM D3763, which is entitled "Standard Test Method for High Speed Puncture Properties of Plastics Using Load and Displacement Sensors." The term "ASTM D3763" as used herein refers to the test method was approved on Sep. 1, 2015 and published in September 2015, the contents of which are incorporated herein by reference in its entirety. For the referenced ASTM standards, visit the ASTM website, www.astm.org, or contact ASTM Customer Service at service@astm.org.

The Coefficient of Linear Thermal Expansion (CLTE) as measured through thermal mechanical analysis (TMA) of annealed test specimens cut from injection molded plaques is given in (10E-5 mm/mm/° C.) as an average of three data points in the flow direction and three data points in the cross flow direction. Each data point is measured using ISO 11359-2, which is entitled "Plastics—Thermomechanical analysis (TMA)—Part 2: Determination of coefficient of linear thermal expansion and glass transition temperature." The term "ISO 11359-2" as used herein refers to the test method published as the first edition dated Oct. 1, 1999, the content of which are incorporated herein by reference in its entirety.

The as-molded shrinkage may be measured by molding a 4×6×⅛ inch plaque, allowing the plaque to cool to room temperature and re-condition over 48 hours, and measuring the average shrinkage utilizing a fixed gauge.

The after-bake-mold-shrinkage may be measured by heating a room temperature, molded 4×6×⅛ inch plaque to a set temperature of 120° C. for either an hour or a half hour (as indicated), and measuring the average shrinkage after it is returned to room temperature and re-conditioned (or allowed to stabilize by leaving it at room temperature and a controlled humidity for over 24 hours) utilizing a fixed gauge.

The use of the word "a" or "an," when used in conjunction with the term "comprising" in the claims and/or the specification, may mean "one," but it is also consistent with the meaning of "one or more," "at least one," and "one or more than one."

Throughout this application, the term "about" is used to indicate that a value includes the variation of error for the device, the method being employed to determine the value, or the variation that exists among the studies.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

A "method" is a series of one or more steps undertaken that lead to a final product, result or outcome. As used herein, the word "method" is used interchangeably with the word "process."

The term "olefin" as used in this application refers to an alkene wherein at least one carbon-carbon double bond in the molecule is a terminal double bond. Some non-limiting examples of olefins include styrene, ethylene, propylene, butene, pentene, hexene, heptene, octene, nonene, decene, or dodecene.

The above definitions supersede any conflicting definition in any reference that is incorporated by reference herein. The fact that certain terms are defined, however, should not be considered as indicative that any term that is undefined is indefinite. Rather, all terms used are believed to describe the appended claims in terms such that one of ordinary skill can appreciate.

EXAMPLES

The following examples are included to demonstrate embodiments of the appended claims. Those of skill in the art should appreciate that many changes can be made in the specific embodiments which are disclosed and still obtain a like or similar result without departing from the spirit and scope of the disclosure herein.

Examples 1-4 were prepared using the materials, in the weight percentage that were based on the total composition weight, summarized in Table 1.

First, the additives (as indicated in Table 1) were mixed with less than 1 weight percent of talc (based on the overall composition) in a low-speed-offline-ribbon blender. In an embodiment, the premixing may enhance distribution of the additives and help prevent agglomerations from forming with potentially tacky raw materials. Then the additive blend, along with all other remaining ingredients, were loaded into a mixing chamber of a Farrel F270 Banbury Mixer (at the same time) and processed per the processing conditions of Table 2.

The blended compositions of each of Examples 1-4 were withdrawn from the Farrel F270 Banbury Mixer to a dump extruder, extruded through a die and pelletized, and later tested in accordance with the various testing methods of Table 3. The results of the tests are provided in Table 3.

TABLE 1

| Category | Raw Materials | MFR | Condition | Density | Example 1 (wt. %) | Example 2 (wt. %) | Example 3 (wt. %) | Example 4 (wt. %) |
|---|---|---|---|---|---|---|---|---|
| Masterbatch Carrier | Masterbatch Carrier B | 3.5 | 230° C., 2.16 kg | | 1 | 1 | | 1 |
| Polyolefin | Polyolefin A (PP homopolymer) | 120 | 230° C., 2.16 kg | | 43.95 | | | 43.05 |
| | Polyolefin B (PP homopolymer) | 65 | 230° C., 2.16 kg | | | 58.35 | 54.35 | |
| | Polyolefin C (PP homopolymer) | 2.5 | 230° C., 2.16 kg | | 13.7 | | | 14.6 |
| | Polyolefin D (PP homopolymer) | 1800 | 230° C., 2.16 kg | | | | 5 | |
| Elastomers | First Elastomer A (ethylene-butene copolymer) | 0.8 | 190° C., 2.16 kg | 0.875 | 16.6 | 16 | 16 | 16.6 |
| | First Elastomer B (ethylene-butene copolymer) | 1.2 | 190° C., 2.16 kg | 0.862 | | 8.55 | 8.55 | |
| | Second Elastomer A (ethylene-octene copolymer) | 13 | 190° C., 2.16 kg | 0.864 | 10.65 | | | |
| | Second Elastomer B (ethylene-octene copolymer) | 30 | 190° C., 2.16 kg | 0.870 | | | | 10.65 |
| Impact-modifying compatibilizer | Impact-modifying compatibilizer A (SEBS) | 22 | 230° C., 5 kg | 0.90 | 3 | 5 | 5 | 3 |
| Filler | High aspect ratio talc. <3.5 um median diameter and top cut around 10 um. | | | | 9.25 | 9.25 | 9.25 | 9.25 |
| Additive Package | Antioxidant | | | | 0.30 | 0.30 | 0.30 | 0.30 |
| | Scratch aid | | | | 0.25 | 0.25 | 0.25 | 0.25 |
| | Nucleator | | | | 0.15 | 0.15 | 0.15 | 0.15 |
| | Neutralizer | | | | 0.05 | 0.05 | 0.05 | 0.05 |
| | Dispersion aid | | | | 0.10 | 0.10 | 0.10 | 0.10 |
| Colorant | Carbon black masterbatch with PE carrier | | | | 1 | 1 | 1 | 1 |

TABLE 2

| Farrel F270 Banbury Mixer, 270 Liter, 4-wing rotor |
|---|
| Process Conditions - Banbury |
| Hopper Dump Time (s) - 10 |
| Pre-Mix Ram Pressure (Psi) - 0 |
| Pre-Mix Time (s) - 7 |
| Ram Pressure (Psi) - 65 |
| Intermediate Mix Temp (° F.) - 328 |
| Intermediate Addition Time (s) - 4 |
| Final Mix Temp (° F.) - 345 |
| Final Amps - 800 |
| Flop Time (s) - 8 |
| Drop Door Time (s) - 6 |
| Chamber Temp (° F.) - 130 |
| Rotor Temp (° F.) - 90 |
| Rotor Speed (RPM) - 95 |
| Process Conditions - Extruder |
| Output Rate (Lb/Hr) - 12,000 |
| Ext Zone 1 Temp (° F.) - 250 |
| Ext Zone 2 Temp (° F.) - 375 |
| Ext Zone 3 Temp (° F.) - 425 |
| Ext Zone 4 Temp (° F.) - 450 |
| Ext Zone 5 Temp (° F.) - 450 |
| Screen Changer Temp (° F.) - 450 |
| Screen Temp (° F.) - 450 |
| Transition Temp (° F.) - 450 |
| Die Temp (° F.) - 450 |
| Water Temp (° F.) - 135 |
| Screen Type - 20/80 |

TABLE 3

| Properties | Method | Units | Example 1 | Example 2 | Example 3 | Example 4 |
|---|---|---|---|---|---|---|
| Melt Flow Rate (2.16 kg, 230° C.) | ASTM D1238 | g/10 min | 21.8 | 25.4 | 31.3 | 25.3 |
| Ash Content (800° C., 30 min) | ASTM D3651 | % | 9.25 | 9.3 | 9.3 | 9.29 |
| Density | ISO 1183 | g/cm$^3$ | 0.95 | 0.96 | 0.95 | 0.95 |
| Tensile Stress Yield | ISO 527-1, 2 | MPa | 23.4 | 22.9 | 23.2 | 22.5 |
| Elongation at Yield | ISO 527-1, 2 | % | 8.9 | 7.8 | 7.1 | 9.9 |
| Elongation at Break | ISO 527-1, 2 | % | 360 | 270 | 70 | 500 |
| MAIL −30° C. 2.2 m/s, Energy at Peak Load and % | ASTM D3763 | J % | 24.7 J 100% Ductile | 23.9 J 100% Ductile | 31.3 J 100% Ductile | 21.0 J 100% Ductile |

TABLE 3-continued

| Properties | Method | Units | Example 1 | Example 2 | Example 3 | Example 4 |
|---|---|---|---|---|---|---|
| Ductility | | | | | | |
| Flexural Modulus Chord (64 mm span, 2 mm/min) | ISO 178 | MPa | 1790 | 1788 | 1787 | 1736 |
| HDT at 1.8 MPa | ISO 75 | ° C. | 52 | 53.2 | 52.3 | 48.4 |
| Charpy 23° C. (Notched) | ISO 179 | kJ/m$^2$ | 42 | 45 | 44 | 41 |
| Charpy 0° C. (Notched) | ISO 179 | kJ/m$^2$ | 29 | 22 | 15 | 23 |
| Charpy −40° C. (Notched) | ISO 179 | kJ/m$^2$ | 3.3 | 4.0 | 4.17 | 4.24 |
| AMMS (48 h) | ISO-294-4- modified by LYB as described above | % | 6.62 | 6.54 | 6.53 | 5.68 |
| ABMS (0.5 h/120° C.) | ISO-294-4- modified by LYB as described above | % | 8.07 | 7.91 | 8.02 | 7.41 |
| CLTE (TMA), Flow (Annealed) | ISO 11359-2 | 10$^{-5}$ mm/mm/C | 6.47 | 6.33 | 6.41 | 6.24 |
| CLTE (TMA), X-Flow (Annealed) | ISO 11359-2 | 10$^{-5}$ mm/mm/C | 6.41 | 6.44 | 6.52 | 6.40 |

All of the compositions, articles of manufacture, and methods disclosed and claimed herein can be made and executed without undue experimentation in light of the present disclosure. While the compositions, articles of manufacture, and methods of this disclosure have been described in terms of certain embodiments, it will be apparent to those of skill in the art that variations may be applied to the compositions, articles of manufacture, and methods, as well as in the steps or in the sequence of steps of the methods described herein without departing from the concept, spirit, and scope of the appended claims.

REFERENCES

The following references, to the extent that they provide exemplary procedural or other details supplementary to those set forth herein, are specifically incorporated herein by reference.

U.S. Pat. No. 3,886,105
U.S. Pat. No. 5,589,555
U.S. Pat. No. 6,084,042
U.S. Patent Publication No. 2015/0045479
WIPO PCT Application No. WO2008/073401
WIPO PCT Application No. WO2009/045351
Anderson, N. G., *Practical Process Research & Development—A Guide for Organic Chemists*, 2$^{nd}$ ed., Academic Press, New York, 2012.
ASTM Standard D1238, "Test Method for Melt Flow Rates of Thermoplastics by Extrusion Plastometer," approved on Aug. 1, 2013.
ASTM Standard D5630, "Standard Test Method for Ash Content in Plastics," approved on Apr. 1, 2013.
ASTM Standard D3763, "Standard Test Method for High Speed Puncture Properties of Plastics Using Load and Displacement Sensors," approved on Sep. 1, 2015.
International Standard ISO 1183-1, "Plastics—Methods for Determining the Density of Non-Cellular Plastics—Part 1: Immersion method, liquid pycnometer method and titration method," second edition, May 15, 2012.
International Standard ISO 178, "Plastics—Determination of flexural properties," fifth edition, Dec. 15, 2010.
International Standard ISO 179-1, "Plastics—Determination of Charpy impact properties. Part 1: Non-instrumented impact test," second edition, Jun. 15, 2010.
International Standard ISO 11359-2, "Plastics—Thermomechanical analysis (TMA)—Part 2: Determination of coefficient of linear thermal expansion and glass transition temperature," first edition, Oct. 1, 1999.

What is claimed is:

1. A composition comprising:
   (a) a polyolefin comprising polypropylene, a propylene-ethylene block copolymer, or combinations thereof, wherein the polyolefin is present in an amount ranging from about 53 wt. % to about 65 wt. %, based on a total weight of the composition;
   (b) a first elastomer, a second elastomer, and an impact-modifying compatibilizer, wherein the combined weight percent of the first elastomer, the second elastomer, and the impact-modifying compatibilizer ranges from about 25 wt. % to about 34 wt. %, based on the total weight of the composition;
   (c) a filler present in an amount ranging from about 5 wt. % to about 12 wt. %, based on the total weight of the composition; and
   (d) an additive package present in an amount ranging from about 0.5 wt. % to about 5 wt. %, based on the total weight of the composition;
   wherein the composition has a density ranging from about 0.90 to about 1.00 g/cm$^3$, an after-bake-mold-shrinkage (0.5 hours, 120° C.) ranging from about 0.5 percent to about 0.9 percent, a coefficient of linear thermal expansion ranging from about 1×10$^{-5}$ mm/mm/° C. to about 8×10$^{-5}$ mm/mm/° C., and a flexural modulus between about 1,200 MPa and about 2,200 MPa.

2. The composition of claim 1, wherein:
   (i) the first elastomer comprises an ethylene-based copolymer having a density from about 0.87 g/cm$^3$ to about 0.90 g/cm$^3$, wherein the first elastomer is present in an amount ranging from about 10 wt. % to about 22 wt. %, based on the total weight of the composition;
   (ii) the second elastomer comprises an ethylene-based copolymer having a density from about 0.85 g/cm$^3$ to about 0.87 g/cm$^3$, wherein the second elastomer is present in an amount ranging from about 4 wt. % to about 15 wt. %, based on the total weight of the composition; and (iii) the impact-modifying compatibilizer is present in an amount ranging from about 0.5 wt. % to about 8 wt. %, based on the total weight of the composition,
wherein the combined weight percent of the first elastomer, the second elastomer, and the impact-modifying compatibilizer ranges from about 25 wt. % to about 34 wt. %, based on the total weight of the composition.

3. The composition of claim 2, wherein the ethylene-based copolymer of the first elastomer has a melt flow rate (MFR, ASTM D1238, 190° C., 2.16 kg) from about 0.4 g/10 min to about 1.1 g/10 min.

4. The composition of claim 3, wherein the ethylene-based copolymer of the first elastomer is selected from an ethylene-butene copolymer, ethylene-hexene copolymer, and an ethylene-octene copolymer.

5. The composition of claim 4, wherein the ethylene-based copolymer of the first elastomer is an ethylene-butene copolymer.

6. The composition of claim 2, wherein the ethylene-based copolymer of the second elastomer has a melt flow rate (MFR, ASTM D1238, 190° C., 2.16 kg) from about 1 g/10 min to about 1.5 g/10 min.

7. The composition of claim 2, wherein the ethylene-based copolymer of the second elastomer has a melt flow rate (MFR, ASTM D1238, 190° C., 2.16 kg) from about 5 g/10 min to about 50 g/10 min.

8. The composition of claim 2, wherein the impact-modifying compatibilizer is a styrene-ethylene-butylene-styrene (SEBS) rubber having a melt flow rate (MFR, ASTM D1238, 230° C., 5 kg) from about 15 g/10 min to about 30 g/10 min.

9. The composition of claim 2, wherein the impact-modifying compatibilizer is a $C_2/C_3$ rubber having a melt flow rate (MFR, ASTM D1238, 230° C., 2.16 kg) from about 0.1 g/10 min to about 1.5 g/10 min.

10. The composition of claim 1, wherein the additive package comprises one or more of the following:

an antioxidant;
a mold release;
a scratch reduction additive;
a nucleating agent;
a neutralizer/acid scavenger selected from the group consisting of magnesium aluminum hydroxycarbonate and hydrates thereof; and
stearic acid or a stearate salt.

11. The composition of claim 10, wherein the additive package comprises a nucleating agent, wherein the nucleating agent is hexahydrophthalic acid, a salt thereof, or an anhydride thereof.

12. The composition of claim 1, wherein the composition has a melt flow rate (MFR, ASTM D1238, 230° C., 2.16 kg) from about 15 g/10 min to about 50 g/10 min.

13. The composition of claim 1, wherein the composition has a density from about 0.90 g/cm³ to about 0.97 g/cm³.

14. The composition of claim 1, wherein the composition has a coefficient of linear thermal expansion (CLTE) from about $5 \times 10^{-5}$ mm/mm/° C. to about $8 \times 10^{-5}$ mm/mm/° C.

15. The composition of claim 1, wherein the composition has a flexural modulus greater than about 1,650 MPa and less than about 2,100 MPa.

16. The composition of claim 1, wherein the composition has an as-molded shrinkage from about 0.4 percent to about 0.8 percent.

17. The composition of claim 16, wherein the as-molded shrinkage is about 0.6 percent.

18. The composition of claim 1, wherein the after-bake-mold-shrinkage percentage of the composition is from 0.6% to 0.9%.

19. An article formed from the composition of claim 1.

20. The article of claim 19, wherein the article is a part of an automobile.

* * * * *